(12) United States Patent
Lipcon

(10) Patent No.: US 12,169,507 B2
(45) Date of Patent: *Dec. 17, 2024

(54) DATABASE COMPACTION IN DISTRIBUTED DATA SYSTEM

(71) Applicant: Cloudera, Inc., Palo Alto, CA (US)

(72) Inventor: Todd Lipcon, San Francisco, CA (US)

(73) Assignee: CLOUDERA, INC., Palo Alto, CA (US)

( * ) Notice: Subject to any disclaimer, the term of this patent is extended or adjusted under 35 U.S.C. 154(b) by 720 days.

This patent is subject to a terminal disclaimer.

(21) Appl. No.: 16/424,083

(22) Filed: May 28, 2019

(65) Prior Publication Data

US 2019/0278783 A1    Sep. 12, 2019

Related U.S. Application Data

(63) Continuation of application No. 15/073,509, filed on Mar. 17, 2016, now Pat. No. 10,346,432.

(Continued)

(51) Int. Cl.
*G06F 16/27* (2019.01)

(52) U.S. Cl.
CPC .................... *G06F 16/278* (2019.01)

(58) Field of Classification Search
CPC .... G06F 16/278; G06F 16/217; G06F 16/221; G06F 3/0608; G06F 3/061; G06F 3/0614; G06F 3/0626

See application file for complete search history.

(56) References Cited

U.S. PATENT DOCUMENTS

| 7,548,928 B1 | 6/2009 | Dean |
| 7,567,973 B1 | 7/2009 | Burrows et al. |

(Continued)

FOREIGN PATENT DOCUMENTS

| EP | 2898432 B1 * | 7/2020 | ............ G06F 16/116 |
| JP | 2010146113 A | 7/2010 | |
| WO | WO2013074665 | 5/2013 | |

OTHER PUBLICATIONS

Yang et al., A Distributed Storage Model for EHR Based on HBase, 2011 International Conference on Information Management, Innovation Management and Industrial Engineering, pp. 369-372 (Year: 2011).*

(Continued)

*Primary Examiner* — Cheyne D Ly
(74) *Attorney, Agent, or Firm* — Perkins Coie LLP

(57) ABSTRACT

A compaction policy imposing soft limits to optimize system efficiency is used to select various rowsets on which to perform compaction, each rowset storing keys within an interval called a keyspace. For example, the disclosed compaction policy results in a decrease in a height of the tablet, removes overlapping rowsets, and creates smaller sized rowsets. The compaction policy is based on the linear relationship shared between the keyspace height and the cost associated with performing an operation (e.g., an insert operation) in that keyspace. Accordingly, various factors determining which rowsets are to be compacted, how large the compacted rowsets are to be made, and when to perform the compaction, are considered within the disclosed compaction policy. Furthermore, a system and method for performing compaction on the selected datasets in a log-structured database is also provided.

20 Claims, 9 Drawing Sheets

Related U.S. Application Data

(60) Provisional application No. 62/134,370, filed on Mar. 17, 2015.

(56) References Cited

U.S. PATENT DOCUMENTS

| | | | |
|---|---|---|---|
| 8,010,492 | B2 | 8/2011 | Biswal et al. |
| 9,280,570 | B2 | 3/2016 | Pruner |
| 9,519,676 | B1 | 12/2016 | Finnie et al. |
| 2003/0018644 | A1 | 1/2003 | Bala et al. |
| 2004/0148303 | A1 | 7/2004 | Mckay et al. |
| 2004/0199519 | A1 | 10/2004 | Gu et al. |
| 2005/0240615 | A1 | 10/2005 | Barsness et al. |
| 2007/0033354 | A1 | 2/2007 | Burrows et al. |
| 2011/0010330 | A1 | 1/2011 | McCline et al. |
| 2011/0022574 | A1 | 1/2011 | Hansen |
| 2011/0082854 | A1 | 4/2011 | Eidson |
| 2011/0213775 | A1 | 9/2011 | Franke |
| 2011/0258242 | A1 | 10/2011 | Eidson et al. |
| 2011/0276744 | A1 | 11/2011 | Sengupta et al. |
| 2012/0016851 | A1 | 1/2012 | Hrle et al. |
| 2012/0016852 | A1 | 1/2012 | Hrle et al. |
| 2012/0072656 | A1 | 3/2012 | Archak et al. |
| 2012/0078978 | A1 | 3/2012 | Shoolman et al. |
| 2012/0323971 | A1 | 12/2012 | Pasupuleti |
| 2013/0117247 | A1 | 5/2013 | Schreter et al. |
| 2013/0166554 | A1 | 6/2013 | Yoon et al. |
| 2013/0198139 | A1 | 8/2013 | Skidanov et al. |
| 2013/0275476 | A1 | 10/2013 | Chandler |
| 2013/0311612 | A1 | 11/2013 | Dickinson |
| 2013/0339293 | A1 | 12/2013 | Witten et al. |
| 2014/0081918 | A1 | 3/2014 | Srivas |
| 2014/0215170 | A1 | 7/2014 | Scarpino et al. |
| 2014/0244599 | A1 | 8/2014 | Zhang et al. |
| 2014/0279855 | A1 | 9/2014 | Tan et al. |
| 2014/0297601 | A1 | 10/2014 | Pruner |
| 2014/0304219 | A1 | 10/2014 | Yoon |
| 2015/0026128 | A1 | 1/2015 | Drobychev et al. |
| 2015/0088824 | A1 | 3/2015 | Kamp et al. |
| 2015/0237127 | A1 | 8/2015 | Khemani |
| 2015/0242400 | A1 | 8/2015 | Bensberg et al. |
| 2016/0070618 | A1 | 3/2016 | Pundir et al. |
| 2016/0275094 | A1 | 9/2016 | Lipcon et al. |
| 2016/0328429 | A1 | 11/2016 | Lipcon et al. |
| 2017/0351718 | A1 | 12/2017 | Faerber et al. |
| 2018/0150490 | A1 | 5/2018 | Lipcon |

OTHER PUBLICATIONS

Hofhansl, L., About HBase flushes and compactions, hadoop-hbase. blogspot.com/2014/07/about-hbase-flushes-and-compactions.html, pp. 1-2. (Year: 2014).*

Wei et al., iBigTable: Practical Data Integrity for BigTable in Public Cloud, CODASPY'13, Feb. 18-20, 2013, San Antonio, Texas, USA, pp. 341-352. (Year: 2013).*

Chang, F. et al., "Bigtable: A Distributed Storage System for Structured Data." Google, Inc., OSDI 2006, 14 pages.

Extended Search Report for European Application No. 16790218.8; Date of Mailing: Jan. 4, 2018, 6 pages.

Extended Search Report for European Application No. 16765788.1; Date of Mailing: Jan. 12, 2018, 9 pages.

Examination Report for European Application No. 16765788.1; Date of Mailing: Apr. 16, 2019; 6 pages.

Lipcon et al., "Kudu: Storage for Fast Analytics on Fast Data*," Sep. 28, 2015; retrieved from the internet: URL:https://kudu.apache.org/kudo.pdf [retrieved on Dec. 13, 2017]; 13 pages.

International Search Report and Written Opinion for Application No. PCT/US2016/031391; Applicant: Cloudera, Inc.; Date of Mailing Aug. 17, 2016, 11 pages.

International Search Report and Written Opinion for International Application No. PCT/US2016/022968; Applicant: Cloudera, Inc.; Date of Mailing: Jul. 8, 2016, 7 pages.

Menon, et al., "Optimizing Key-Value Stores for Hybrid Storage Architectures," CASCON '14 Proceedings of the 24th Annual International Conference on Computer Science and Software Engineering, Nov. 3, 2014; pp. 355-358.

Sakr et al., A Survey of Large Scale Data Management Approaches in Cloud Environments, IEEE Communications Surveys & Tutorials, vol. 13, No. 3, Third Quarter 2011, pp. 311-336.

Chang, Fay , et al., "Bigtable: A Distributed Storage System for Structured Data", ACM Transactions on Computer Systems, vol. 26, No. 2, Article 4, Pub. date: Jun. 2008.

Menon, Prashanth , et al., "Optimizing Key-Value Stores for Hybrid Storage Architectures", Middleware Systems Research Group, University of Toronto, IBM Canada Software Laboratory, CAS Research, IBM T.J. Watson Research Center, pp. 355-358.

Wikipedia, "Multiversion concurrency control", May 1, 2015 version (Year: 2015), 6 pages.

Bernstein et al., "Concurrency Control in Distributed Database Systems", Jun. 1981 (Year: 1981), 37 pages.

* cited by examiner

DATABASE COMPACTION IN DISTRIBUTED DATA SYSTEM

CROSS-REFERENCE TO RELATED APPLICATIONS

This application is a continuation of U.S. patent application Ser. No. 15/073,509, filed Mar. 17, 2016, and which claims the benefit of U.S. Provisional Patent Application No. 62/134,370, filed Mar. 17, 2015, both of which applications are incorporated herein by reference in their entireties.

BACKGROUND

The need for better data storage services and those that provide greater storage capacity have substantially increased in recent times. Furthermore, as a centralized approach to data storage becomes more prevalent, distributed databases such as those designed using cloud-based storage systems have become an industry standard.

In distributed, large-scale storage systems, improved indexing mechanisms are usually implemented to decrease latency (i.e., time to access data). When performing a read operation, for example, a storage system can look for queried data using an in-memory index mapped to various data nodes distributed across a network. Projects like Apache's HBase, Google's BigTable, etc, provide both the software and the software framework for reliable, scalable and distributed processing of large data sets in a network of computers, or clusters, communicating over the Internet. A particular file system, (e.g., Google's table or Apache's cluster), typically comprises a name node (master server) and a plurality of data nodes (tablet servers). In some instances, one or more clusters can also be referred to as a distributed database in the distributed file system (DFS). A DFS is typically managed by a service provider who deploys a unified file system in which a name node (running a file sub-system of the unified file system) manages a plurality of data nodes.

In order to efficiently read and update the files in each distributed database, or datastore, a name node includes various other software components which determine when certain thresholds have been reached. For example, the thresholds can be related to a time limit, a file size limit, and the like, for job scheduling and resource management within the distributed database. Additionally, the name node can determine when certain failovers have occurred in data nodes order to re-direct data processing to other data nodes and avoid data loss.

For example, Apache's Zookeeper provides a centralized service for maintaining configuration information and naming, and also for providing distributed synchronization and group services, Apache's HBase provides a non-relational datastore, which is a scalable, distributed No-Structured-Query-Language (NoSQL) database that supports structured storage of large tables, similar to Google's BigTable. Generally, HBase includes a region server instance on each of the data nodes and depends on a ZooKeeper service running on the name node to coordinate the region servers. Each of the region servers manages data files underlying the large tables, look-ahead logs and other metadata in a data directory on the data node. Each of the distributed databases are also supplemented by additional projects which help provide programming framework for job scheduling and cluster resource management. Examples of additional projects can be Apache's MapReduce or Google's Chubby.

In order to maintain a table up-to-date, old data within the table needs to be removed and new data needs to be added quickly and efficiently. Furthermore, the data stored in the table needs to occupy the least amount of space possible in order to make room for the new data to be stored. Various techniques for updating and maintaining efficient tables are available. Such techniques are typically known as compaction.

Traditional compaction techniques, however, typically cause system resources to be wasted by performing compactions too often, or performing compactions on datasets which do not optimize tablet efficiency. This can substantially impact existing workloads as well as storage space for the DES, which increases costs for the service provider. Thus, embodiments of the present disclosure facilitate an efficient approach for maximizing storage as well as minimizing the cost of I/O operations without causing interruptions.

DETAILED DESCRIPTION

Figure 1:
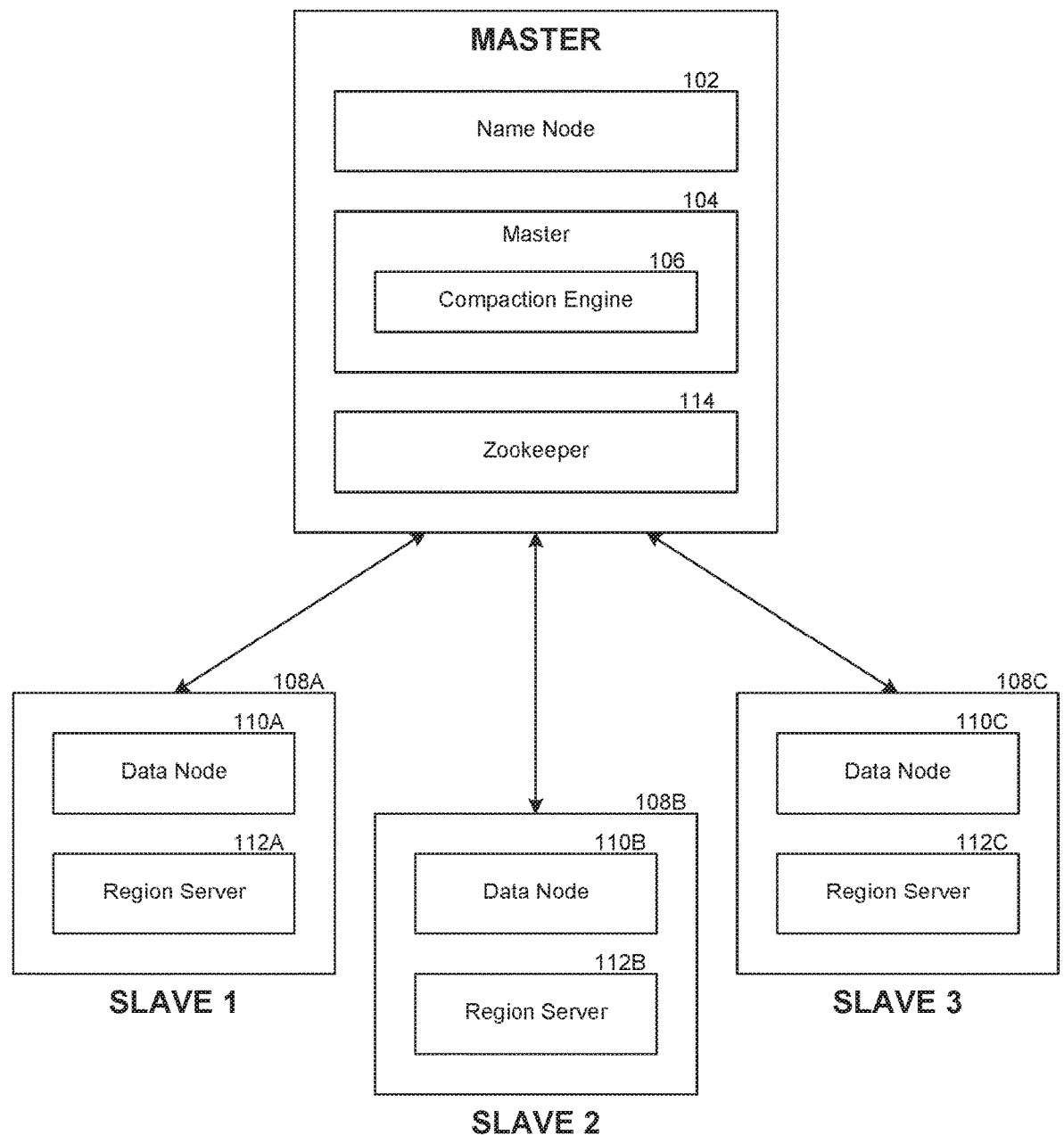
FIG. 1 illustrates an exemplary architecture of a distributed filed system in which data compaction may be utilized.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

As used herein, a "server", an "engine", a "module", a "unit" or the like may be a general purpose, dedicated or shared processor and/or, typically, firmware or software that is executed by the processor. Depending upon implementation-specific or other considerations, the server, the engine, the module or the unit can be centralized or its functionality distributed. The server, the engine, the module, the unit or the like can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In a log-structured database, instead of writing to a disk randomly, data is temporarily stored (e.g., buffered) in memory and a log is maintained to specify the disk location (s) where the data is to be written. This buffered data is flushed to the disk at a later time. Thus, there is a delay between the time when data comes in and when that data gets written onto the disk. This is typically because magnetic spinning disks are slow for random access operations. However, if data can be held temporarily in memory and then flushed out to disk, then sequential write operations can be performed on the disk. Because sequential write operations are faster than random write operations, this results in faster write operations.

As new data comes in, such data first enters a memory buffer referred to as MemRowSet, which is similar to an in-memory cache. The data in the buffer later spills to the disk, e.g., a datastore such as HBase, in smaller sorted files in a memory flush process. Thus, the data is typically sorted in memory, and then flushed on to the disk in smaller sorted files according to a memory flush process. The sorted files are typically partitioned (horizontally) and stored in sorted string tables (SSTables) or Hfiles that are often referred to as tablets. These tablets are each portions of a much larger data table that is stored across a distributed file system (DFS), such as a Hadoop File System (HDFS) or BigTable.

Tablets can be subdivided into smaller units called Row-Sets. Some RowSets exist in memory only, termed MemRowSets, while others exist in a combination of disk and memory, termed DiskRowSets. However, it is likely that the primary key intervals of different RowSets may intersect or overlap. (Each rowset stores a collection of primary keys.) The previous MemRowSet is written to disk, and becomes one or more DiskRowSets. This flush process is fully concurrent: readers can continue to access the old MemRowSet while it is being flushed, and updates and deletes of rows in the flushing MemRowSet are carefully tracked and rolled forward into the on-disk data upon completion of the flush process.

In log-structured databases such as BigTable, Cassandra, Accumulo, and HBase, compaction techniques are used to organize the on-disk data into segments (or, equivalently referred to herein as chunks or rowsets or RowSets). The segments are ordered by a primary sort key. Accordingly, when servicing read workloads, these on-disk segments are accessed using the primary sort key to search for the data that is being read from the disk.

One idea behind compaction techniques is to facilitate a consistent or effective read performance. To maintain consistent read performance, the data segments, or the smaller sorted files are typically merged together into larger sorted segments. This improves the read performance at the time of reading/searching the data but, however, involves sequential I/O costs upfront in order to perform the merge. Thus, in order to service a read workload, the larger sorted segments are accessed instead of the plethora of smaller sorted segments that were written to the disk.

In compaction, smaller, individually sorted segments or rowsets are merged to larger sorted segments. For example, five or six of the smaller sorted segments can be merged together into a segment that is sorted using a primary sort key. Each segment or rowset can include a collection of rows and each row has a primary key. (In embodiments where a segment includes more than one identical row, it is likely that the primary key appears in multiple rows within that segment.) Because the segments are sorted, algorithms such as binary search or B-tree index can be used to access, or read the sorted data, with a relatively smaller number of read operations.

In some embodiments, the contents (e.g., keys) of a segment (e.g., a rowset) are individually sorted but one segment is not related to other segments. Each rowset can have a plurality of rows, and each row has a primary sort key. For example, when searching for a primary sort key called "Todd," there could be one or more segment that includes this primary sort key. Each of these one or more (sorted) segment may not have a relationship with other segments. A logarithmic data access method such as binary search can be used to look up the data with the primary key "Todd" in each of the one or more individual (sorted) segments. Searching for the primary key "Todd" is of complexity O(n), where n is the number of the one or more (sorted) segments that include this primary key.

Given the large amount of data stored on-disk, which can range in the petabytes across the DFS and megabytes on each tablet, compacting the smaller segments into larger segments results in a reduced read workload. However, servicing a read on a large sorted file, can cause latency since the length of a row (including multiple segments) can be significantly long and each segment in that row is to be sequentially accessed. Consequently, determining a middle ground to optimize the system efficiency thus becomes a balancing act of (a) selecting the appropriately-sized smaller sorted segments, (b) determining a size of the larger sorted segments, and (c) identifying the times when compaction is to be performed. For example, the disclosed compaction policy results in a decrease in a height of the tablet, removes overlapping rowsets, and creates smaller sized rowsets. Typically, rowsets that are selected for compaction are, on an average, those rowsets that overlap, are wide (e.g., span a wide keyrange) but are not too large in size.

Embodiments of the present disclosure provide systems and methods for performing compaction on log-structured databases. The systems and methods disclosed herein enable efficient data storage and retrieval for a distributed, e.g., cloud computing environment. Specifically, taking into consideration the various factors relating to a data compression operation, can reduce the overall operating cost of the storage system. These factors facilitate data operations to increase data quality and availability to reduce I/O operations, with minimal impacts existing workloads.

Embodiments of the present disclosure also include systems and methods for performing a data flush into a log-structured distributed database as well as compaction methods for merging the existent data within the database. Embodiments of the present disclosure also provide methods for a compaction policy that selects how and which data is compacted on log-structured databases, such as within Big-Table (Google), Cassandra (Apache/Dynamo), HBase (Apache/Hadoop), and similar non-relational distributed database, or DFS. These methods further define a compaction policy implemented to determine when to perform data compaction on a log-based database. The compaction policy includes a plurality of factors on which the compaction depends. For example, the disclosed methods can factor in the physical layout of the rowsets to improve the efficiency of subsequent operations. For example, in some scenarios, accessing multiple shorter rows of the smaller sorted files can be more efficient than accessing a significantly long row of these files. Also, compaction policies that result in minimum utilization of system resources are more desirable, thereby lowering I/O costs. In some exemplary embodiments, evenly distributing the system resources during the compaction process is desirable, such that system performance stays predictable and substantially constant. In other words, during the compaction process, it can be desired that the system performance shows no or relatively less spikes.

Specifically, embodiments of the present disclosure propose a new compaction policy for merging data files on-disk. The compaction policy pertains to merging rowsets in tablets. In exemplary embodiments, a compaction policy places a soft limit on the size of these files, and uses a cost-based analysis to select the optimal files that are to be merged. The compaction policy improves on previous methods by maximizing a user-directed measurement of performance while maintaining a given budget for I/O. Additionally, the compaction policy provides a more consistent performance by breaking all requests, e.g., the system workload, into size-bounded units.

The methods and system used to implement compaction in a distributed database, such as in a distributed file system (DFS) are further discussed in the following description, beginning with a general overview of a DFS with reference to FIG. 1

FIG. 1 illustrates an exemplary environment in Which the disclosed compaction policy may be utilized to facilitate storage in a log-structure database system. In the illustrated environment, a non-relational distributed database (datastore) in a distributed file system (DFS) is provided. The datastore can also be referred to as a table or cluster, having a master node 100 and a plurality of slave nodes 108A, 108B, and 108O. The master node 100 may be implemented on one or more servers and may include file management software, such as a Zookeeper 114. A slave node 108A, for example, may include a data node 110A and a region server 112B instance. A data node 110A, for example, can comprise a plurality of tablets, which are portions of a large distributed table managed by the master node 100. Each tablet stores data which is tracked by the master node 100. Although not shown in FIG. 1, the master node 100 may also include an iterator, a garbage collector, and various other processes utilized within the datastore. The datastore shown in FIG. 1, may be deployed over a cloud-based platform via a cloud-based service provider, which may offer storage and/or other services remotely through a DFS. In general, the cloud-based service provider hosts a cloud-based platform which enables users to simultaneously access stored data remotely in real-time or near real-time. Users may additionally add, update, delete or otherwise modify the data stored in the cloud-based platform. The cloud-based service provider may implement an architecture suited for handling the large volume of user requests through the cloud-based platform. Accordingly, lowering I/O accesses and reducing storage on associated databases provides a more efficient system.

In general, the slave nodes 108 communicate with the master node 100 via a network. For example, an open network, such as the Internet, or a private network, such as an intranet and/or the extranet, or any combination or variation thereof. The network can be any collection of distinct networks operating wholly or partially in conjunction to provide connectivity to the DFS and may appear as one or more networks to the serviced systems and devices. In one embodiment, communications can be achieved by a secure communications protocol, such as secure sockets layer (SSL), or transport layer security (TLS).

Figure 2:
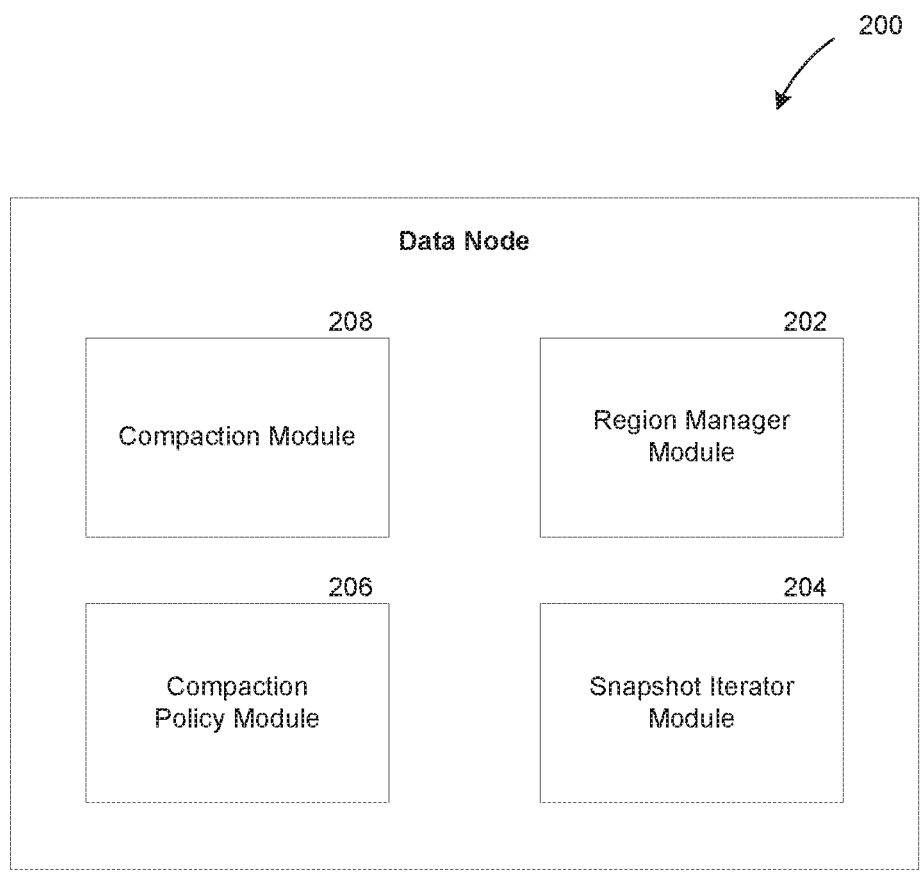
FIG. 2 illustrates a block diagram including exemplary components of a compaction engine in the distributed file system of FIG. 1.

FIG. 2 shows a block diagram illustrating exemplary components of the compaction engine. In one embodiment, the compaction engine comprises a region manager module 202, a snapshot iterator module 204, and a compaction policy module 206. The snapshot iterator module 204 manages a snapshot for a table, including its creation and modification. It can operate in either an offline mode or an online mode.

Figure 3A:
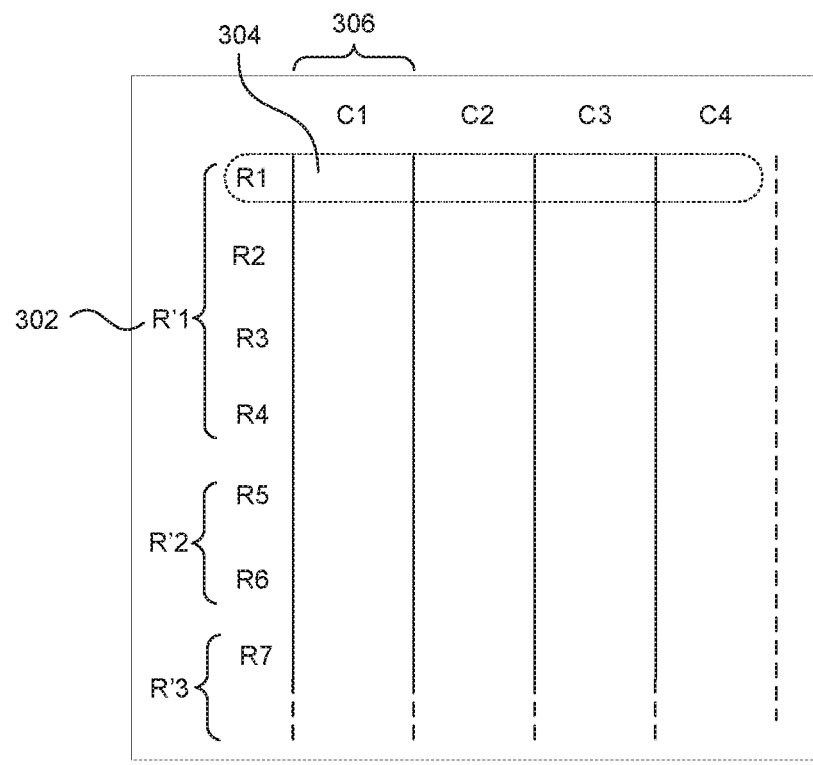
FIG. 3A illustrates an exemplary tablet of data stored in a distributed file system of FIG. 1.
Figure 3B:
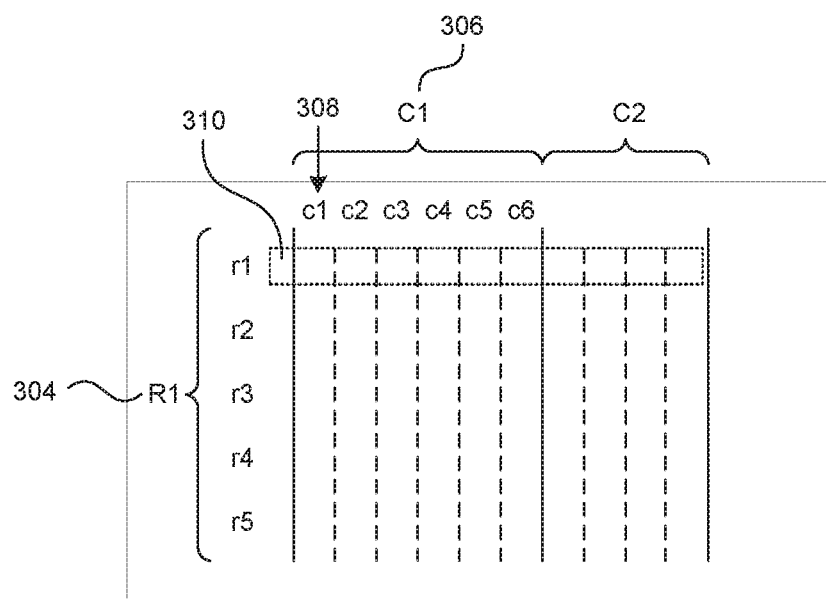
FIG. 3B illustrates an exemplary RowSet within the table of FIG. 3A.

FIGS. 3A and 3B illustrate exemplary snapshots of a master table in which data is stored as different columns. For purposes of this description, DiskRowSets in a table are represented as "R'", rowsets included within a DiskRowSet stored on a tablet are represented as "R", and rows included within a rowset are represented as "r". As shown, each DiskRowSet, e.g., represented as diskrowsets R'1, R'2, R'3, etc., can include multiple rowsets stored within a particular row and column in the master table. Thus, diskrowset R'1 includes rowsets R1, R2, R3, and R4. Diskrowset R'2 includes rows R5 and R6. Each rowset can include multiple rows. For example, rowset R1 includes rows r1, r2, r3, r4, and r5, as shown in FIG. 3B. (A DiskRowSet is a type of rowset, thus every DiskRowSet is also, in turn, a rowset.)

This method of encapsulation of data would allow, for example, DiskRowSet R'1 to be stored on a first tablet, and DiskRowSet R2 to be stored on a second tablet. These tablets, can in turn, be managed by several region servers running on the data nodes of a cluster. For example, a region server 112A in tablet 108A of FIG. 1 can manage rowset R1 (i.e., row 304) and any addenda, and region server 112B in tablet 108B of FIG. 1 can manage files in diskrowset R'2 and any addenda, and so on. Each diskrowset, e.g., R'1, R'2, R'3 can be individually sorted, but they may not necessarily be sorted with respect to one another.

Similarly and as shown in FIG. 3B, each of C1 and C2 are representative of a column family under which numerous columns (c1, c2, etc.) can be associated. Accordingly, though the master table of the DFS may have any number of DiskRowSets (e.g., R'1, R'2) and columns (C1, C2), portions of the data included within that table can be distributed for handling across various networked computers, hence the name of a distributed file system (DFS) and the distributed databases forming clusters within that DFS. FIG. 3B illustrates a table on a tablet, or data node, such as R'1 in FIG. 3A. The data files stored within a given datastore may therefore be stored in any one of these rows (r1), in a corresponding rowset (R1), and associated with a DiskRowSet row (R'1) in a table. The data file may also be associated with a particular column (c1) in a column family (C1).

Typically, in datastores such as HBase, changes to existing data are represented as addendums rather than modifying the existing data. Since the data is stored sequentially on a disk, when such data is accessed, the most recent version of the data is returned and the older version of the file is eventually discarded, or removed from disk during a garbage collection (GC) process.

Figure 4:
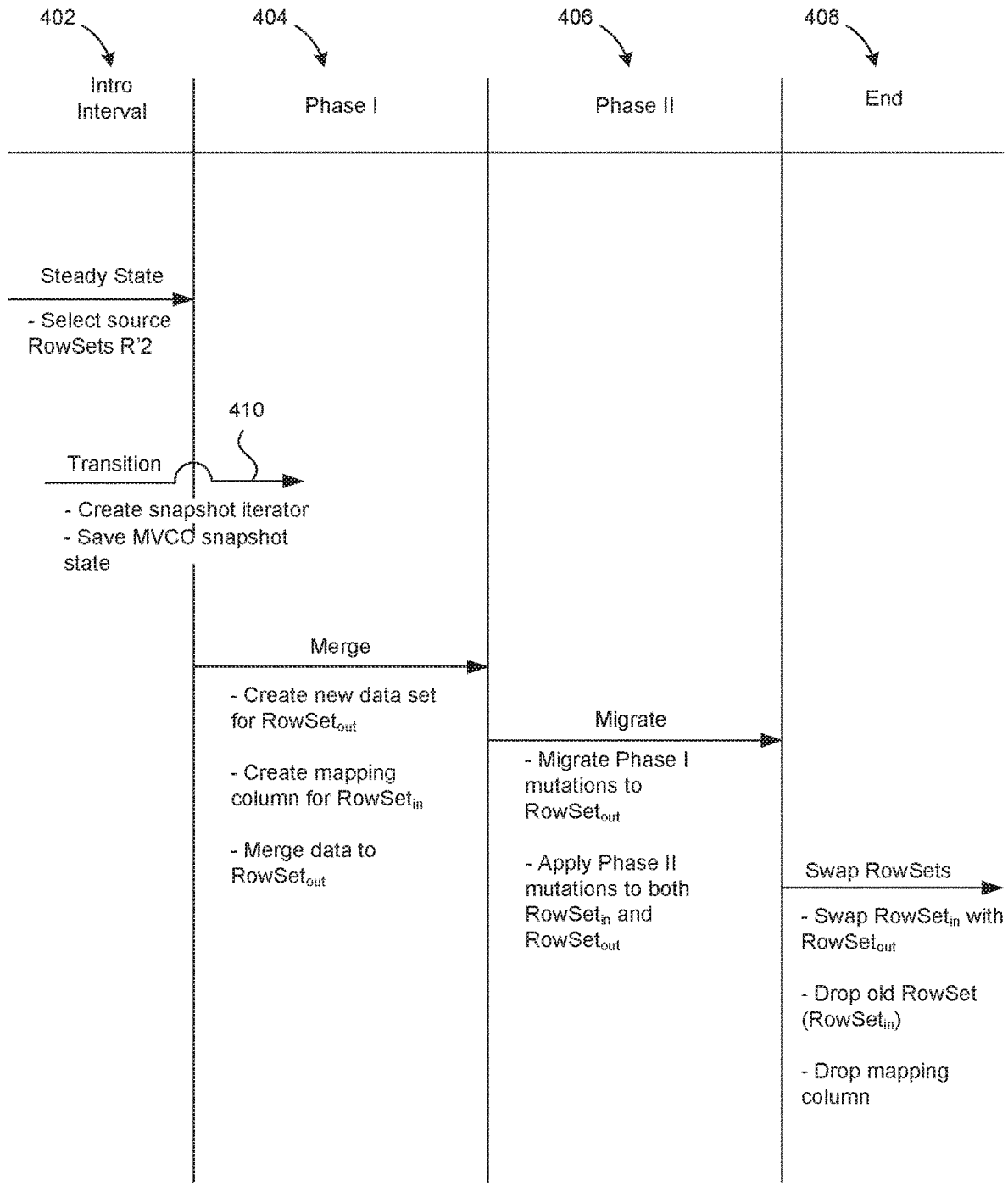
FIG. 4 illustrates an exemplary timing diagram for a process of performing a compaction on a tablet within a distributed file system.

FIG. 4 illustrates an exemplary compaction process, implemented in four stages on a particular rowset, e.g., such as on a data node in a cluster. The compaction of one or more rowsets can occur concurrently with an update to the rowsets. Compaction is also referred to herein as a merge of two or more rowsets on-disk, e.g., on a particular data node. In some embodiments, compaction can include a merge of two or more diskrowsets. In some embodiments, a compaction can include a merge of a diskrowset and a rowset.

Starting with the first stage 402 of compaction, a data node is initialized to a steady state. In the steady state, all updates, i.e., data added to the system or changes to already stored data, are applied only to a selected rowset or diskrowset. The selected rowset may also be referred to as a source rowset. For example, the source rowset may be DiskRowSet R'1, in FIG. 3A, which includes rowsets R1, R2, R3, and R4. In other embodiments, the source rowset may include, for example, rowset R1, or rowsets R2 and R4, or any one or combination thereof. In other embodiment, entire rowsets are compacted together, e.g., R1 and R2, rather than just rows r1, r2, r3, etc. within an individual rowset. For purposes of this discussion, and with reference to FIG. 4, it is assumed that the rows within one rowset are compacted such that one input rowset (e.g., $RowSet_{in}$) is compacted to one output rowset (e.g., $RowSet_{out}$).

During a transition state 410, which occurs between the first stage 402 and the second stage 404, e.g., Phase I, the system may create a snapshot iterator to merge input rowsets from an in-memory cache, or buffer, that store new data and updates to add to the source rowset. The input rowsets include rowsets of new data files that are to be stored on-disk at the corresponding data node, e.g., tablet. The snapshot iterator can also be utilized to save an associated snapshot taken during the transition state 410 which serves as a static copy of the current state of the source rowset prior to the merge. Accordingly, any reads on the source rowset occurring concurrently with the compaction process will reflect the same data until the merge is complete. This type of snapshot isolation is also commonly referred to in the art as a multiversion concurrency control (MVCC) snapshot of the source rowset at a current state. The MVCC snapshot can be saved on-disk as a backup to the source rowset state such that any data removed, changed and/or lost during a merge can be recovered and provided to the end-user, if necessary.

After the snapshot is saved during the transition state 410, the compaction process enters the second stage, which is the merge phase, "Phase I" 404 of the compaction process. In Phase I 404, the snapshot iterator created during the transition state 410, is utilized to create a new data set for an output rowset. The output rowset can include the combined data in the source rowset and in the input rowset (e.g., from the in-memory cache). In some embodiments, the output rowset can reflect updates or deletes which arrived prior to the compaction process entering Phase I 404. In some embodiments, updates or deletes occurring once Phase I 404 begins or during Phase II 406 are not reflected in the new data set of the output rowset.

In some embodiments, during Phase I 404, an additional integer column (also referred to herein as mapping column) is also created in order to maintain track of the rows in the input rowset. The integer column includes an integer entry for each row. Accordingly, if a row is garbage collected (GC) during the merge, the removal of those rows can be mapped to a corresponding row ID of the output rowset. For example, if the number of rows in the input rowset is "N" and no rows are compacted (e.g., deleted) in the output rowset, then the integer column will reflect "1, 2, 3, 4 . . . N". On the other hand, if rows are compacted during the merge phase 404, then the integer column may reflect, e.g., "1, 2, x, 3, x, 4, . . . N", where each "x" is a value denoting a row deleted in the output rowset. Garbage collecting (GC) rows can provide additional on-disk space for new rowset flushes from the in-memory cache and can help maintain the efficiency of the reads on-disk.

In some embodiments, if any mutations arrive during Phase I 404 those mutations are applied to the delta tracking structures, of the input rowset. Mutations, for example, include any changes to the data stored in the table. For example, adding data, deleting data, modifying data, re-arranging data, etc. are considered mutations. Since the merge in Phase I operates on the snapshot taken by the snapshot iterator, the mutations received during Phase I are not taken into account in the output rowset. In some embodiments, during a third stage "Phase II" 406 of the compaction process, these mutations are migrated into the output rowset.

In some embodiments, during the migration stage of Phase II 406, the mutations received during Phase I are handled, as well as any mutations arriving during Phase II. The mutations received during Phase I are simply migrated to the output rowset. This is accomplished by aggregating all the mutations not included in the snapshot iterator and merging the ordinal indexes with the mapping, or integer column which was created during Phase I. This merge effectively translates the old rowID to the new rowID.

Accordingly, each mutation can be inserted into the output rowset's delta tracking structures.

To account for the mutation arriving in Phase II, the mutations are applied to both the input rowset and the output rowset. This replication is performed in, order to ensure that no data loss occurs during the compaction process. For example, if a mutation is received for a GC'ed row as reflected in the integer column of the input rowset, then these mutations can be migrated into the subsequent row of the output rowset. The replication of the mutations can additionally help maintain data consistency and reliability within the system since any reads which occur during Phase II 406 of the compaction process are handled by the input rowset. Thus, any mutations arriving in Phase II 406 are still reflected in those reads.

In order to replicate the mutations received during Phase II 406 of the compaction process, the key lookup may be duplicated into the output rowset's key column. Alternatively, in another embodiment, the integer column used for mapping the rows in Phase I may be utilized.

Once all of the mutations have be handled, the input rowset and the output rowset have logically identical data though the output rowset is compacted. Accordingly, Phase II ends and the process enters a fourth stage 408. In the fourth stage 408 the two logically identical rowsets (e.g., input rowset and output rowset) are atomically swapped. In other words, the rowset data is swapped without any interrupts occurring in the system and in a one-step operation. Once the output rowset is swapped with the input rowset, e.g., the output rowset effectively becomes the new input rowset and the input rowset becomes the new output rowset, any updates or other mutations arriving for the rowset are only applied to the new input rowset. The new output rowset (i.e., the original input rowset) and its associated mapping column may then be dropped, or discarded, providing additional disk space for new data to be stored. Then, the compaction process ends.

The compaction process discussed in FIG. 4 may also be applied to multiple rowsets concurrently. For example, during the transition state 410, instead of a snapshot being taken of just one rowset, a snapshot is taken of each rowset and a snapshot iterator is created. A merge iterator can also be created in order to merge all of the snapshots in ascending key order to a new data set corresponding to the multiple output rowsets. Similar to the compaction process discussed in FIG. 4, the merge iterator simultaneously creates an integer column for each rowset during the merge of each corresponding snapshot. The integer, or mapping column can include a rowID for each old rowset in a respective snapshot.

A compaction policy, or the process of selecting rowsets to apply the above compaction process in distributed database is now discussed with reference to FIGS. 5-9. Though only one rowset or one keyspace is discussed in certain embodiments, it is understood that the compaction policy may be applied to any number of keyspaces, combined or individually, as well as any number of rowsets, tablets, or tables.

Figure 5:
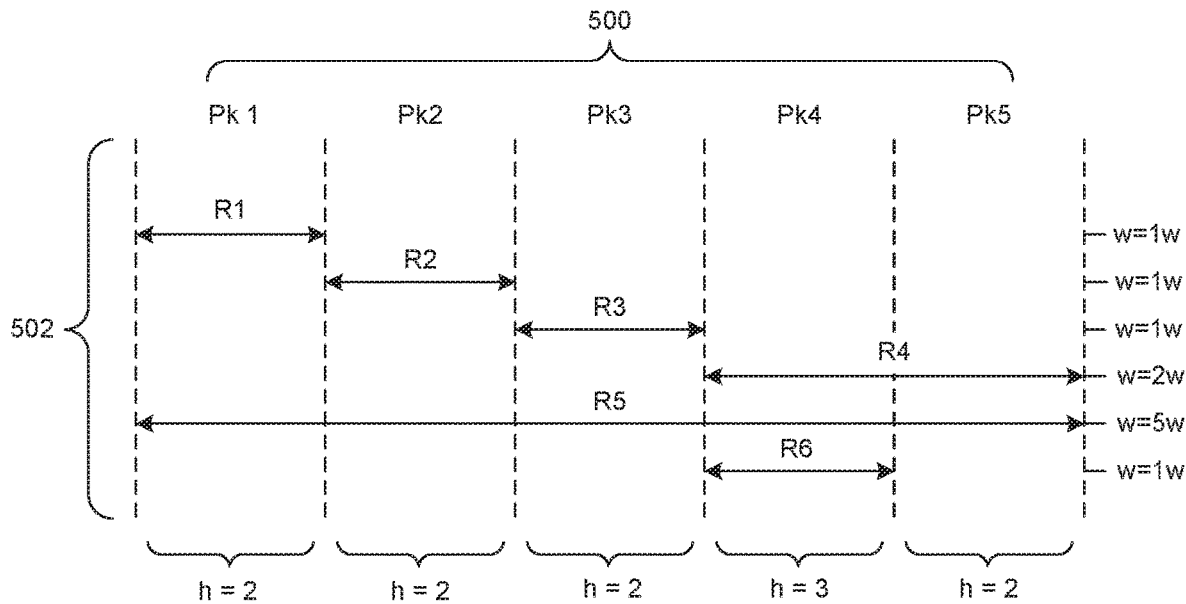
FIG. 5 illustrates exemplary rowsets with overlapping key values.

FIG. 5 is an exemplary diagram of numerous rowsets of variable size in a plurality of keyspaces on, for example, a data node that includes a tablet 500. In embodiments of the present disclosure, tables and corresponding sub-tables, e.g., tablets located in a cluster of a DFS can include indexed rowsets. Each rowset has rows and columns in which keys of arbitrary byte strings are stored. Each key has a value within an associated tablet 500. As illustrated in FIG. 5, rowsets 502, e.g., rowsets R1-R6, may be stored on a tablet. Each rowset is shown as an interval occupying one or more key spaces 504, based on the first and the last key. The keyspaces each span horizontally (e.g., x-axis) and may also be referred to by their primary sort key, represented as "Pk". For example, rowset R1 occupies keyspace Pk1, while rowset R5 occupies keyspaces Pk1 Pk5. Thus, in this example, rowset R1 overlaps in range with rowset R5.

Utilizing the rowsets R1-R6 and associated keyspaces Pk1-Pk5, in some embodiments, a cost measure can be defined for performing a compaction on those rowsets. This cost measure can be applied to any rowset or rowsets, as a simple function based on known data, such as within a metadata file, which is maintained and updated on each tablet 500. The cost measure can be defined based on one or more variables within the tablet, e.g., as indicated via a hardware cost and/or a software cost associated with I/O operations. A first variable can be the widths of the selected rowsets in the tablet 500. A second variable can be the height of each keyspace in the tablet 500.

The width of a rowset can be proportional to the percentage of a keyspace that it spans. For example, the tablet 500 includes five keyspaces Pk1-Pk5. If each keyspace is assumed to be equal to "w", then R1 has width 1$w$, R2 has width 1$w$, R3 has width 1$w$, R4 has width 2$w$, R5 has width 5$w$, and R6 has width 1$w$. In numerical terms, for example, each width "w" can represent, for example, 0.2 or 20% of the keyspace spanned in the tablet 500. This width can be used to represent the probability that any read (or other operation) in a uniform random read workload will have to consult a particular rowset.

The height of a particular keyspace can be defined as the number of rowsets that have overlapping key ranges. For example, Pk1 has a height of "2" because rowsets R1 and R5 overlap in Pk1, Keyspace Pk2 has a height of "2" because rowsets r2 and R5 overlap in Pk2. Also, Pk3 has a height of "2", Pk 4 has a height of "3", and Pk5 has a height of "2". The height of a particular keyspace can be used to represent the number of rowsets that will have to be consulted for a random read of that key. Thus, in FIG. 5, the height of the tablet ranges between two and three.

With these two variables, e.g., a width of a rowset in a keyspace and a number of rowsets included in a keyspace, a cost can be calculated specific to each operation performed on the tablet 500. For example, reads on a particular tablet (or rowset) may generally refer to accesses to data and may encompass specific operations such as inserts, random reads, short scans, long scans, and other operations known in the art. For inserts to be handled in the tablet 500, each rowset needs to be checked for a duplicate key of the known key value included in the insert request. Accordingly, the insert is made in the rowset having a keyspace including that key.

To more efficiently determine this result, by not querying each rowset, the rowset key ranges can be stored within an interval tree. Referring to FIG. 5, if, for example, data is to be inserted in a keyspace covered in the interval Pk4, then querying each rowset for a duplicate key would return the rowsets R4, R5 and R6. In some embodiments, consulting the interval tree can quickly return that R4, R5, and R6 may include the key corresponding to the insert without having to query rowsets R1 and R2. The associated cost measure to determine which of the three rowsets (R4, R5, or R6) includes the key for the insert is linear in those three rowsets. For example, the entire rowsets R4, R5 and R6 and keyspaces spanned by those rowsets will need to be queried to locate the corresponding key for the insert.

This cost measure can be represented in the following equation 1:

$$\text{Cost}_{insert} = n(C_{bf} + B_f * C_{pk}) \quad \text{(equation 1)}$$

In equation 1, "n" can represent the height (i.e., the number of rowsets accessed during a scan) of the tablet at the keyspace including the given key, e.g., Pk4, the "$C_{bf}$" can represent the cost to run a bloom filter check on the rowsets R4, R5 and R6 in the keyspace, the "$b_f$" can represent the bloom filter false positive rate, and the "$C_{pk}$" can represent the cost of a primary key lookup (e.g., one seek in the interval tree).

In some embodiments, the bloom filter misses "$B_f$" equal to approximately one percent (1%) or lower, so the bloom filter checks dominates the cost measure equation and the second term ($B_f * C_{pk}$) can be ignored and would not drastically change the cost measure. In some embodiments, however, the primary key column ($C_{pk}$) is very large and every primary key check incurs a disk seek. This causes the "$C_{pk}$" value to be orders of magnitude higher than "$C_{bf}$", which is likely stored in the random access memory (RAM) element or solid-state drive (SSD). In the aforementioned embodiment, the term resulting from the bloom filter misses ($B_f$) would then be indispensable and would noticeably alter the cost measure. Accordingly, in embodiments in which a larger keyspace is to be accessed, the impact of the second term in the cost measure can be significant.

To process a random read, the cost measure approximates the cost measure for an insert. Accordingly, given a known key for the read, each potentially overlapping rowset in that keyspace is queried. Conversely, for short scans, bloom filters are not utilized. Short scans can include, for example, a seek with a primary key in one rowset retrieving one or more short data segments. Furthermore, in a short scan, the sequential I/O cost after finding the start key is small compared to the seek cost. For example, this comparison may include a ten millisecond (10 ms) seek time and one megabyte (1 MB) or less of sequential I/O.

For short scans, the cost measure is similar to the inserts and reads, except that all overlapping rowsets need to be looked up by the primary key. This can be represented in the following equation 2:

$$\text{Cost}_{short} = n * C_{pk} \quad \text{(equation 2)}$$

Comparing equation 2 with equation 1, the only difference is that all bloom filter terms are removed, resulting in a direct relationship with the number of overlapping rowset in key column $C_{pk}$.

In the case of long scans, computing a cost measure for long scans requires additional terms to be factored into equation 2. For example, the disk space spanned by the scan and the disk bandwidth spanned by the scan are accounted for since, comparatively, a scan on 1 MB (short) is going to be nominally faster than a scan on 10 MB (long). In order to cover such a large amount of data, long scans can include full table scans or seeks on data from numerous rowsets. Factoring in the size of the rowsets in the long scan is therefore important to determine the cost measure, as represented in the following equation 3:

$$\text{COSt}_{long} = n * C_{pk} + S/B_w \quad \text{(equation 3)}$$

The additional term "$S/B_w$" accounts for the rowset size, where "S" can be the number of megabytes (MB) covered by the scan and "$B_w$" can be the disk bandwidth (MB/sec). The term "n" indicates the number of rowsets accessed during the scan.

The commonality shared among each of the aforementioned cost measure operations is that each rely significantly on the number of rowsets accessed in order to perform the operation, e.g., "n". Therefore, in accordance with embodiments disclosed herein, the cost of sequential I/Os to perform an operation on the log structured database directly correlates to the number of rowsets accessed. Based on this correlation, embodiments of the proposed compaction policy aim to minimize this cost by minimizing the number of rowsets accessed, while also taking into consideration that performing a read on a substantially large rowset causes increased latency for return.

Since minimizing the number of rowsets accessed during a read is not usually plausible, two strategies may be considered to account for this factor within the compaction policy. A first strategy includes merging rowsets with overlapping keyspaces in order to improve the cost for point queries, such as short scans, inserts and random reads, thereby reducing the overall height of the tablet. This strategy produces linear returns. The taller the tablet height becomes, the longer the return for one seek. In other words, the more number of rowsets on which to perform a seek, the longer it takes to return for one seek. A second strategy includes merging all rowsets to improve the ratio of sequential I/O to seeks, e.g., minimizing the number of rowsets, in order to improve the cost for long scans. In the latter strategy, the end result is an extremely large rowset (≥10 MB) spanning an entire keyspace, assuming that the original rowsets are reasonably large. Accordingly, the cost is optimal, since any given access requires one seek and one bloom filter, at most. However, as mentioned previously, performing sequential I/O on a rowset this large results in diminished return time for one read. For example, one seek on 10 MB of sequential I/O may take one hundred milliseconds (100 ms) as opposed to ten milliseconds (10 ms) for a seek on 1 MB. Though either strategy may be implemented, the first strategy is therefore preferable over the second strategy since one factor, e.g., return time, is not significantly diminished for the sake of the second factor, e.g., cost for performing a seek on the rowsets.

An additional consideration for implementing the second strategy is the cost of performing a compaction on such a large rowset and the wasted I/O on performing a compaction on all rowsets during each compaction in order to maintain the large rowset. Compacting such a large rowset also causes immense write amplification because each compaction rewrites the entire rowset. To summarize, in some embodiments, the efficiency gain of improving the ratio of sequential I/O to seeks by compacting the rowsets into a large rowset does not outweigh the diminished efficiency and increased cost of performing the compaction, nor the increased return time. Therefore, the first strategy of compacting overlapping rowsets can be the preferable approach.

Determining a candidate rowset on which to perform a compaction thus becomes a balancing act between the cost of performing a compaction on the rowset and the efficiency of the rowset prior to and after performing the compaction. In embodiments discussed herein, the cost of performing the compaction may be the sum of I/O performed by the compaction (e.g., Output (Input size)), assuming deletions are rare and the compaction inputs are large enough that sequential I/O outweighs any seeks required. By weighing these two factors of compaction cost and rowset efficiency against one another, the implemented compaction policy can selectively determine which rowsets should be compacted at any given time.

A final factor considered within the compaction policy is the way in which the compaction is performed. For example, performing a large compaction at longer time intervals decreases system performance during those compactions, whereas incrementally performing compactions more frequently maintains a consistent performance profile for the end-user applications. Incrementally performing the compactions on smaller data sets also allows the system to react more quickly to changes in the workload. For example, if an area of a keyspace becomes overloaded, the system is able to compact that area within a short time frame. This is because only one incremental compaction needs to occur prior to compacting the overloaded area rather than a very large and time consuming compaction.

To facilitate incremental compaction, the system may impart bounds on the data size for each compaction to read and write. For example, the bounds may include data sizes in the range of several hundred megabytes, which allows the compaction to occur in ten seconds (10 s) or less. These bounds also help to maintain a consistent and lower cost for each compaction to occur in addition to a consistent time to complete the compaction.

Figure 6:
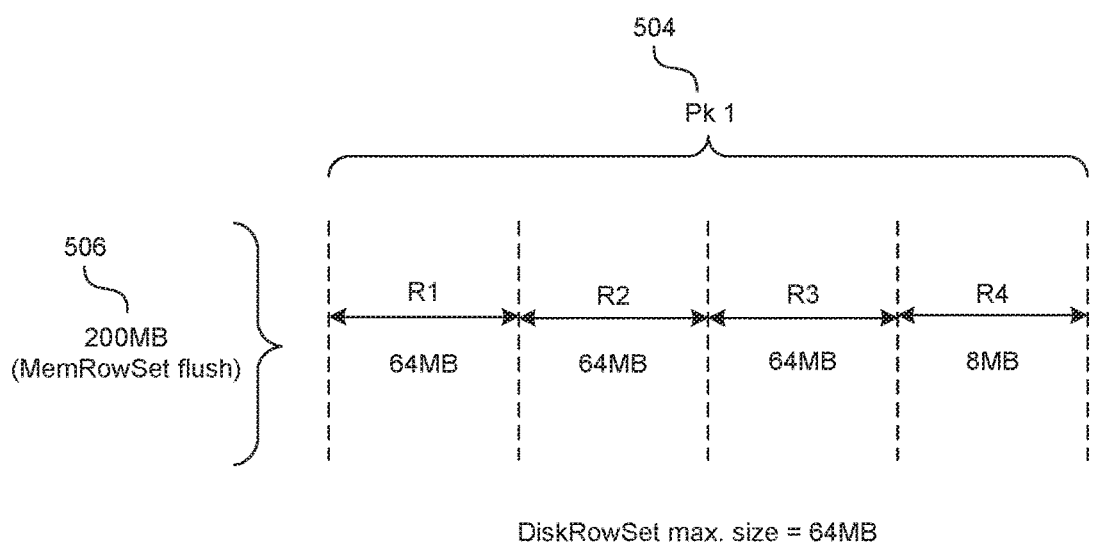
FIG. 6 illustrates exemplary rowsets with bounded sizes.

FIG. 6 is an example diagram of numerous rowsets of bounded size stored in a plurality of keyspaces. In order for the system to limit a size of a rowset within predefined bounds, the DiskRowSet writer code may be modified to roll over to a new rowset once a threshold (e.g., upper bound) rowset size is met. In the example illustrated in FIG. 6, the maximum rowset size is 64 MB, e.g., DiskRowSet max=64 MB.

When the new dataset stored in the MemRowSet 506 buffer is flushed to disk, this data is then distributed to a keyspace, e.g., Pk1, within the predefined bounds of Disk-RowSet. For example, given a 200 MB data flush from MemRowSet, R1 is 64 MB, R2 is 64 MB, R3 is 64 MB, and R4 is the remaining 8 MB. In some embodiments, the system may estimate the on-disk data size such that each rowset receives equal or approximately equal data sizes during the flush.

After several MemRowSet flushes, keyspaces often include various rowsets with small files spanning the entirety of the keyspace because these bounds cause roll over rowsets of lesser length. For example, in FIG. 6, R4 includes only 8 MB of the 64 MB maximum. These small sized rowset commonly occurs in, for example, uniform random insert load.

After several MemRowSet flushes, various smaller sized rowsets may be overlapping within a particular keyspace. For example, with respect to FIG. 6, Pk1 may additionally include rowset R5 (22 MB) and rowset R6 (8 MB), Rowset R5 and R6 can both overlap with rowset R4, causing the depth of the Pk1 to be three which, in turn, causes the average rowset depth in that keyspace to be three. Thus, each access to the tablet requires a query to each of the rowsets in that keyspace which decreases the performance of the tablet, Once the compaction policy is able to identify these rowsets to compact, then the output rowset, e.g., R7 (38 MB) created from rowsets R4, R5, and R6 maybe reorganized within the keyspace and include a single, non-overlapping rowset occupying the space of R4, assuming the range of R4 to be encompassing the ranges of rowsets R5 and R6. The average rowset depth in that keyspace then equals one. In the aforementioned embodiment, the improvement to the tablet performance outweighs the I/O cost of performing the compaction. The tablet configuration cost may then be optimized under a given I/O budget.

In order to facilitate identifying rowsets having overlapping key ranges for the compaction policy, the tablet code may be modified to store the rowsets in interval trees instead of simple lists. An interval may include a data structure which provides an efficient query for a set of intervals overlapping a given query point or query interval. Hence, any overlapping rowset within a particular keyspace may be identified within the tree.

Figure 7:
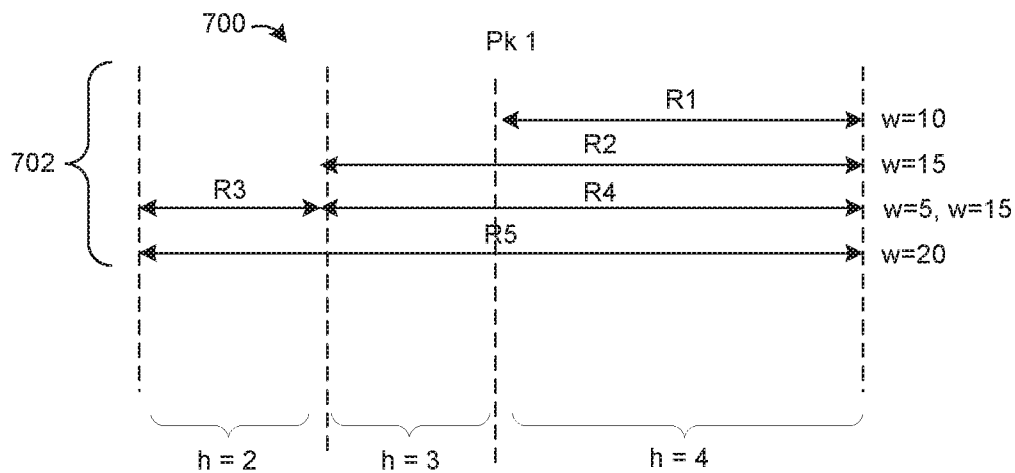
FIGS. 7-9 illustrate exemplary rowsets in a keyspace on which a compaction policy may be implemented.

FIG. 7 illustrates various overlapping rowsets within a keyspace Pk1 700, which may be identified by an interval tree (illustrated with the help of vertical dashed lines). In the embodiments illustrated in FIGS. 7-9, each of the rowsets are assumed to be the same size, with overlapping portions appearing to span less range within the keyspace Pk1 700. However, with numerous overlapping rowsets in the keyspace, the efficiency of the system decreases because each access to the tablet queries each level of the rowsets, which equals the height of the keyspace. For example, in FIG. 7 the rowset depth, or keyspace height 702, ranges between two (h=2) and four (h=4).

As discussed previously, the height of a rowset being queried in a particular keyspace is linear to the cost of a single read or insert. Thus, to calculate the average cost of I/O operations on rowsets in a particular keyspace, the tablet height is integrated across that keyspace. This integration equates to summing the widths of all rowsets in that keyspace. For example, in FIG. 7, the cost (R1+R2+R3+R4+R5) equals approximately sixty-five (65). To decrease the height of the keyspace and, subsequently, the cost of performing an I/O operation, the compaction may be used to identify and select rowsets for compaction. These rowsets may be chosen based on the given I/O budget and the cost of optimal tablet configuration.

Figure 8:
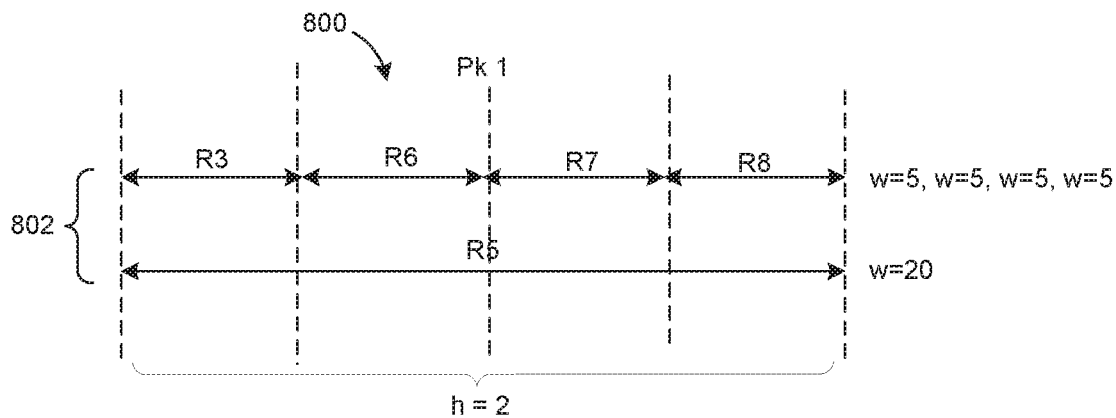

FIG. 8 illustrates an exemplary compaction of various rowsets in Pk1 800 shown in FIG. 7. For example, R1, R2, R4, may be selected for compaction in order to reduce the height of the tablet by two. These rowsets may be selected as good candidates for compaction because each of the rowsets spans a smaller range (e.g., in comparison to the keyranges of compacting rowsets R1, R2, and R5) within keyspace Pk1 800 and is included in the maximum height range (e.g., 3) of the keyspace. A compaction process may be performed on the selected rowsets as described with reference to FIG. 4. Once compacted, the rowsets R1, R2, and R4 can map to rowsets R6, R7 and R8 in order to decrease depth in the tablet's rowsets, to remove overlapping rowsets, and create smaller sized rowsets. Each of these factors improve the performance and related I/O costs of the tablet. For example, the cost of performing I/O operations, such as inserts, is now reduced to forty (40). As mentioned previously, this is calculated by integrating the height of tablet across all rowsets. The compaction benefit for cost is therefore twenty-five (25) for a budget of three (3) I/O operations (e.g., 1 for seek and 2 for compaction process). To calculate the cost benefit, e.g., reduction, the cost of the compacted rowsets (e.g., sum of the output widths) is subtracted from the cost of the original rowsets (e.g., sum of the input widths). For example, the original cost (i.e., the sum of the input widths) in FIG. 7 is (65) and the output cost (i.e., the sum of the output widths) is (40), the difference of which equals (25). Additionally, because each of the output rowsets no longer overlap, the total width of those rowsets spans the union of the input rowset ranges. Thus, the aforementioned cost difference can also be computed as the cost of the original rowsets (e.g., sum of the input widths) minus the union width of the original rowsets.

It should also be noted that, though compacted, the total number of bytes have not changed in the tablet. Rather, the bytes have been rearranged in a more compact form and the height of the tablet is now equal to two (2). Additionally, it is noted that the aforementioned cost calculation may similarly be applied to string keys by treating the string data as unsigned integers, just as the key ranges within the embodiments described above are treated as integers to sum the widths of the rowsets.

Figure 9:
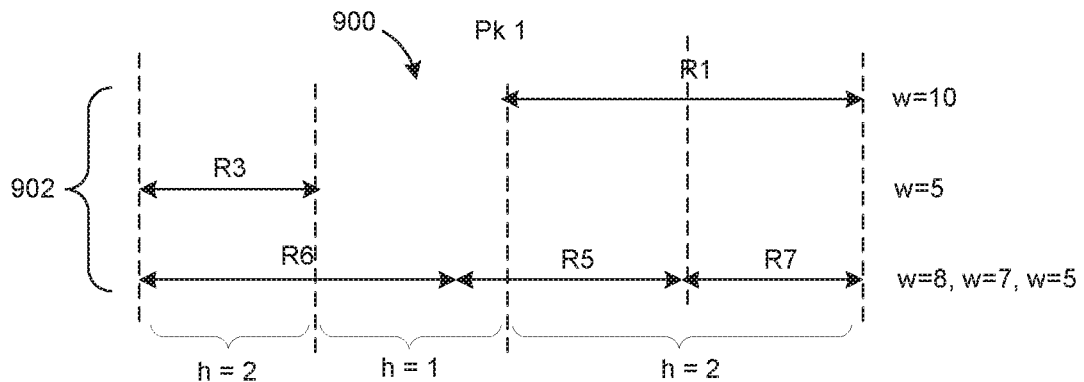

FIG. 9 illustrates an alternate embodiment in which an incremental compaction is performed on the rowsets depicted in FIG. 7. Instead of selecting rowsets R1, R2, and R4 for compaction, the compaction policy may select rowsets R2, R4, and R5. By selecting R5, it can be assumed that at least one level of depth is removed from the tablet, since the rowset spans the entire keyspace Pk1 900. Additionally, the selection of rowsets R2, R4, and R5 compacts each of the widest rowsets in the tablet, thereby reducing the range of keyspace spanned by each rowset in the tablet, which improves tablet performance for shorts scans, inserts, reads, etc.

After compacting rowsets R2, R4 and R5, the rowsets may be merged into rowsets R6, R7, and R8 as shown in FIG. 9. The height of the tablet is reduced to two (e.g., h=2), improving the performance of the tablet. Additionally, the cost of performing I/O operations is now reduced to thirty-five (35) based on the summed widths of each compacted rowset. Accordingly, the benefit of compaction is thirty (30), which is a slight improvement to the benefit in the embodiment illustrated in FIG. 8 while still operating under the same I/O budget of three (3). Accordingly, the compaction performed in FIG. 9 is the preferable option.

Figure 10:
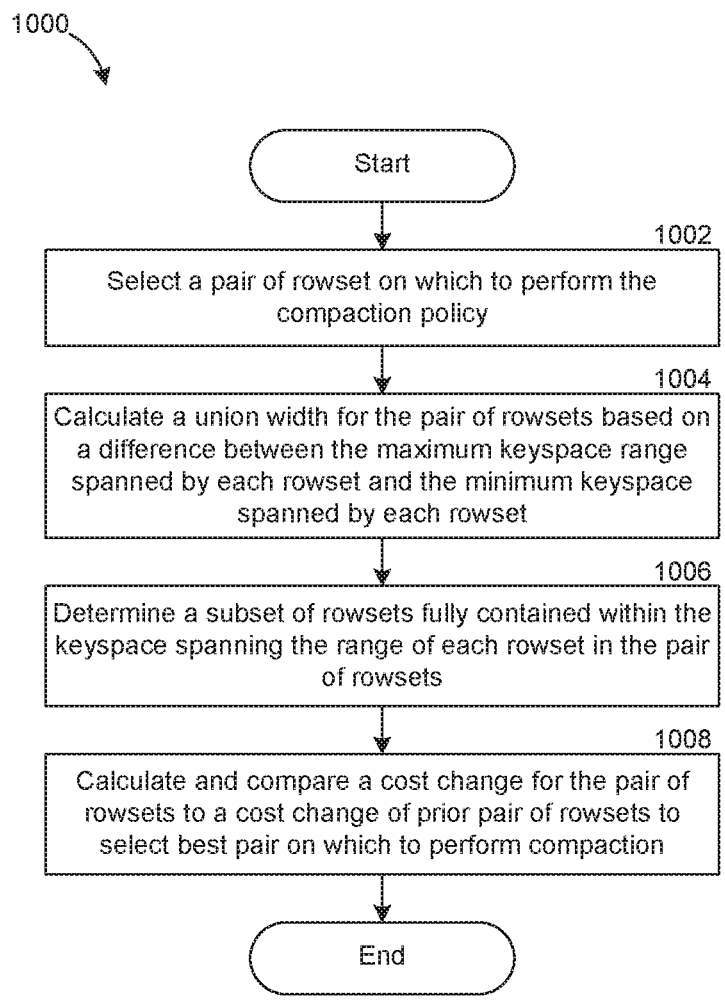
FIG. 10 illustrates an exemplary method for selecting rowsets by a compaction policy.

FIG. 10 includes a method for selecting rowsets on which to perform a compaction using the compaction policy described with reference to FIGS. 7-9. The method may be implemented in an algorithm that includes instructions for a process executed on a server computer of the data node. The algorithm, for example, may be based on constant sized rowsets (e.g., bounded rowsets) as inputs and may be executed given a I/O budget for operations performed on the rowsets. The budget may include the number of I/O operations to perform the compaction on the selected rowsets. Accordingly, the algorithm for the method may include:

Given budget N rowsets:
For each pair of rowsets (A, B):
  Evaluate BestForPair(A, B):
BestForPair(A, B):
  Let union width=max(A.max_key, B.max_key)−min (A.min_key, B.min_key)
  Determine the subset R of rowsets that are fully included within the range A, B
  Evaluate PickRowsetsWithBudget(R, N):
  Set objective=sum(rowset width)−union width
  If objective>best objective:
    best solution=this set An instance of the aforementioned algorithm may be implemented on each tablet in order to maintain an efficient tablet that provides optimal operations, such as reads, scans and inserts, at the lowest possible cost. The inputs include a number "N" of rowsets in a tablet being analyzed for compaction. Specifically, in step 1002, a set of two rowsets "A" and "B", i.e., a rowset pair, is analyzed in one iteration of the algorithm to determine if those rowsets should be selected for compaction. This rowset pair may be sequentially selected in the tablet and the compaction policy may be implemented continuously during each I/O in order to determine the rowset pair for the next compaction. Each step within the algorithm is further detailed in the following corresponding steps within the method illustrated in FIG. 10.

In step 1004, the union width is calculated for a pair of rowsets "A" and "B" being compared to determine the best rowset to compact within that pair. Accordingly, the union width, as discussed with reference to FIG. 9, is determined for the pair of rowsets by finding the maximum range of the keyspace spanned by the rowset pair. For example, in FIG. 7, the maximum key values of R1 and R2 are equal. However, the minimum key value for R1 is greater than the minimum key value of R2. Accordingly, the union is simply the range of keyspace Pk1 covered by R2. This corresponds with the compaction performed on these rows in FIG. 8 in which the width of the compacted rows R6, R7 and R8 equals the width of R2.

In step 1006, a variable R, including a subset of the rowsets fully included within the range of keyspace covered by the rowset pair A and B, is determined. The subset R includes the combined rowsets in the keyspace within the keyspace range covered by A and B. Accordingly, referring back to FIG. 7, if A=R1 and B=R2, both R3 and R5 would not be included within the subset R because both include rowsets outside the range covered by R2. However, R4 includes rowsets fully included within the keyspace range covered by R2. Therefore, the rowsets within R1, R2 and R4 would be included in the subset R.

In step 1008, the subset of rowsets R is evaluated via PickRowsetsWithBudget over the input rowsets N to determine if the subset R provided the best rowset selection for compaction. This evaluation includes a sub-routine which calculates the cost change for variable R in N rowsets to determine which has the best cost change. For the highest pair, it is determined that the compaction policy selects that rowset pair for compaction because the cost benefit is worth the budgeted I/O. If the cost change of subset R is less than a cost change calculated for other pair of rowsets in N, then the budgeted I/O is not worth spending on the compaction of those rowsets. For example, calculating the "objective" for R with reference to FIG. 7, where A=R1 and B=R2, would be 40−15=25. Referencing the same FIG. 7, calculating the objective for R', where A=R4 and B=R5, would include 65−20=45. Thus, in the aforementioned example, the rowsets in subset R' are the better rowset pair to compact. This is clearly demonstrated by the better cost change for the compaction performed in FIG. 9 than the cost change in FIG. 8.

PickRowsetWithBudget is evaluated in order to select the best rowsets to compact. For example, choosing the N rowsets in R which maximize the sum(rowset width) yields the highest objective. Thus, the PickRowsetWithBudget function can be solved by simply sorting the rowsets by their width and choosing the top N. For example, in FIG. 7, the rowsets having the largest widths were compacted in FIG. 9, illustrating that minimizing rowset range in the keyspace provides an improved cost benefit.

The aforementioned method described with reference to FIG. 10 may also be extended to rowsets which are not a constant size. For example, while still maintaining bounds (e.g., a max threshold value) on the rowset size, many smaller rowsets may be stored in keyspaces due to more frequent flushes of smaller size datasets. For example, in FIG. 6, the smaller rowset R4 only includes 8 MB of data and the flush included 64 MB max size rowsets.

To properly account for these smaller rowset sizes while still complying with the aforementioned compaction policy, the given budget for performing the compaction is changed to a number of MB of I/O rather than the number of input rowsets (N). However, making this adjustment to the compaction policy also affects the PickRowsetWithBudget function in which N is a variable. To handle this issue, a set of rowsets are chosen such that their entire file size falls within a budget and maximizes their total widths. This may be solved using a 0-1 knapsack problem solver in place of PickRowsetWithBudget in the algorithm referenced in FIG. 10. For example, the algorithm includes O(n^2) calls to BestForPair. Each of these calls includes a 0-1 knapsack problem, which can result in a complexity of O(n*max_budget). It logically follows then that the total complexity is cubic in the number of rowsets. Considering that any given tablet may have thousands of rowsets, the cubic complexity causes the pair selection process to become quite expensive. Thus, to optimize the approach to implementing the compaction policy on smaller rowsets, the order in which the each rowset pair (A, B) is considered is switched. For example, the previously stated algorithm can be modified as follows:

For each rowset A:
    candidates=all rowsets B such that B.min_key>=A.min_key
    sort candidates B by increasing B.max
    For each pair of rowsets (A, B):
    Evaluate BestForPair(A, B):
BestForPair(A, B):
    Let union width=max(A.max_key, B.max_key)−min (A.min_key, B.min_key)
    Determine the subset R of rowsets that are fully included within the range A, B
    Evaluate PickRowsetsWithBudget(R, N):
    Set objective=sum(rowset width)−union width
    If objective>best objective:
        best solution=this set In some embodiments of the compaction policy algorithm, changing the order in which the pairs are considered can simplify the BestForPair call. For example, because B.max_key does not decrease, the variable R in the step of "Determining the subset R" can remain identical to the previous call except that it includes B at the end. Thus, no additional looping is required. Additionally, the step of "Evaluating" including an instantiation of the knapsack problem, is identical to the previous instantiation except the one additional item. Thus, this instantiation may be computed incrementally from the previous solution.

In some embodiments, upper bounds may also be calculated by solving the fractional knapsack problem and subsequently used to short circuit the more complex calculations. In some embodiments, the compaction policy is implemented on uniform workloads with equal sized rowsets. However, in additional embodiments, the compaction policy may be extended to non-uniform workloads, which may be experienced during use of a DFS. In practice, if a particular area of a key space is experiencing a higher workload, e.g., more accesses, those areas may be compacted prior to other areas in that keyspace. To implement compaction in those high workload areas, in some embodiments, the compaction policy algorithm may be modified to change all references to the "width" of a rowset to a cumulative distribution function (CDF). For example, width=(A.max_key, B.max_key)−(A.min_key, B.min_key) can be replaced by CDF(max_key)−CDF(min_key). The cumulative distribution function accounts for accesses over a lagging time window.

Figure 11:
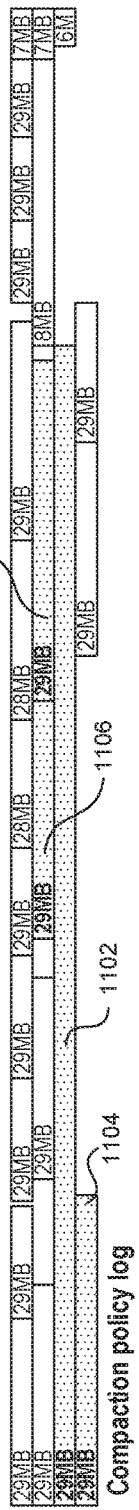
FIG. 11 illustrates a screenshot of a compaction policy log demonstrating compaction.

FIG. 11 illustrates a screenshot showing an example compaction policy log and a collection of exemplary rowsets. In a completely ideal scenario, upon compaction, data in a tablet would be arranged in a manner such that there would be a single rowset spanning a keyspace horizontally or multiple non-overlapping rowsets spanning a keyspace horizontally. But that would consume significant I/O operational cost associated with reading and re-writing all of the data in all the rowsets. Thus, the purpose of a compaction policy is to determine which rowsets to compact and when to compact so that more queries will hit fewer rowsets on an average. Thus, a compaction policy as disclosed herein, achieves a tradeoff of not doing compactions too often and yet doing enough compactions so as to achieve a reasonably compacted tablet. The disclosed compaction policy selects those rowsets in a collection of rowsets which when compacted would result in the improvement of the output metric (e.g., the average height of the tablet), given a fixed I/O budget. The speed (e.g., cost) of a query (e.g., an insert or an update) is linearly related to the number of rowsets that need to be crossed for a given key (e.g., the height of the table).

In FIG. 11, exemplary rowsets, their respective sizes, and their respective key ranges are shown as part of a compaction policy log in region 1152 of FIG. 11. These rowsets are also illustrated visually in region 1150 of FIG. 11. Rowset 85, rowset 71, rowset 41, and rowset 42 are indicated with the numerals 1102, 1104, 1106, and 1108 respectively. These rowsets are shown highlighted (dotted) in region 1150. As an intuitive example, it would result in a greater reduction in the height of the tablet in FIG. 11 if the rowsets in the left part of the tablet are compacted as opposed to the rowsets in the right side of the tablet. Accordingly, the disclosed compaction policy has selected the rowsets (illustrated with highlights) in the left to be compacted. The highlighted rowsets indicate those rowsets included in the collection of rowsets that would be compacted if a compaction were to run on the tablet. Thus, for a fixed (e.g., constrained) I/O budget, and considering the key ranges included in the rowsets, the size (e.g., in MB) of the rowsets, and other such parameters, the disclosed system has determined that the operational cost (e.g., resultant height of the tablet) of compacting the highlighted rowsets would result in the minimum operational cost (e.g., the minimum height) in comparison to compacting the other rowsets. Rowsets that are compacted are, on an average, those rowsets that overlap, are wide (e.g., span a wide keyrange) but are not too large in size. In some embodiments, the keyrange can be expressed as a difference of the maximum key value and the minimum key value in a rowset.

In some embodiments, the size of the rowsets are bounded by a predetermined maximum size (e.g., 32 MB or 128 MB). Depending on the storage characteristics or the workload characteristics, the predetermined maximum can be changed. Sequential spinning disks spend a constant amount of time during a seek operation and a linear amount of time doing the I/O. If the predetermined maximum is very small, then a small amount of I/O would be necessary on a sequential spinning disk. Thus, a very small predetermined maximum size would be inefficient (e.g., low throughput for the drive) as it would result in wasted I/O because sequential spinning disks are faster for large amounts of I/O.

In some workloads however, a relatively small predetermined maximum size, e.g., a 32 MB limit can be chosen if the data is fine-grained in nature and the hardware is more amenable to sequential I/O such as flash. An example of fine-grained data can be keyranges that include time-stamped data and such data is more likely to cause dynamically inserting recently-written data rather than inserting data that was written sometime back. Thus, there might be a sufficiently large amount of compaction activity (e.g., several incremental compactions) with respect to the recently-written data. Accordingly, if this maximum is chosen to be a very large number, then a large amount of data would be read and written every time compaction is performed. This might cause delays in insertion of the data (thereby slowing system performance) while compactions are being performed. This implies that several incremental compactions are redundant in such scenarios. Thus, a relatively small maximum size can be beneficial in adapting to rapid insertions of the data. For example, if the predetermined maximum size is 1 GB, most (or, even all) of the rowsets might be selected as candidates for compaction. However, if the workload is more static, and does not require too many insertions, then a single compaction of all the rowsets can be beneficial, and which can be achieved by a larger maximum size of the rowset.

Figure 12:
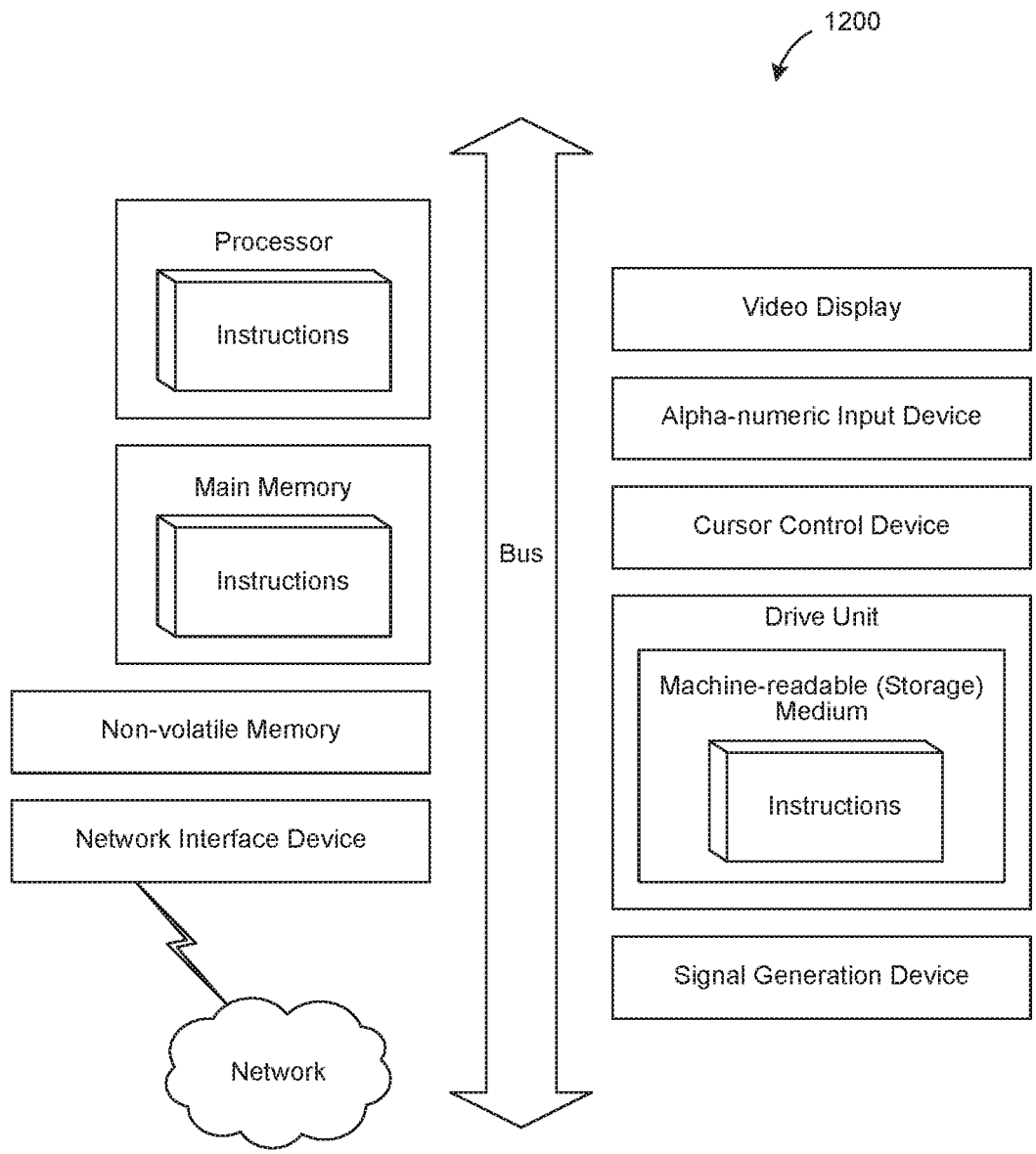
FIG. 12 shows an exemplary computer system architecture for performing one or more of the methodologies discussed herein.

FIG. 12 depicts an exemplary computer system architecture to perform one or more of the methodologies discussed herein. In the example of FIG. 12, the computer system 1200 includes a processor, memory, non-volatile memory, and an interface device. Various common components (e.g., cache memory) are omitted for illustrative simplicity. The computer system 1200 is intended to illustrate a hardware device on which any of the components depicted in the example of FIG. 1 (and any other components described in this specification) can be implemented. The computer system 1200 can be of any applicable known or convenient type. The components of the computer system 1200 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1200. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 1200 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples; alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method for organizing data into segments to improve read performance in a distributed database system having at least a master node and a slave node, the slave node including a data node that hosts a plurality of tablets, the plurality of tablets being a part of a large distributed table managed by the master node, the method comprising:
    instantiating corresponding components of a compaction engine respectively on the master node and on the slave node, wherein the master and the slave nodes are physically separated but communicatively coupled together via a network;
    determining, by the compaction engine, a height of a tablet within a keyspace of the tablet based on a number of rowsets, in a plurality of rowsets included in the tablet, that have key ranges that overlap;
    determining, by the compaction engine, a rowset width of each rowset in the keyspace of the tablet based on a percentage of the keyspace to which the rowset corresponds;
    until a minimum operational cost is reached, iteratively calculating, by the compaction engine, an operational cost associated with compaction of two or more rowsets in the keyspace based on the height of the tablet and the rowset widths of the two or more rowsets;
    selecting, by the compaction engine, two or more particular rowsets for compaction based on the two or more particular rowsets resulting in the minimum operational cost; and
    performing, by the compaction engine through communicating instructions between the master node and the slave node over the network, a compaction of the two or more particular rowsets, the performed compaction resulting in a merger of the two or more particular rowsets,
    wherein the compaction results in one or more of: reduction in the height of the tablet, removal of overlapping rowsets, and/or creation of smaller sized rowsets.

2. The method of claim 1, further comprising:
    receiving new data for the tablet in a memory element stored on a data node associated with the tablet; and
    flushing the new data into a new rowset stored on the tablet.

3. The method of claim 2, further comprising:
    if a new rowset reaches a size threshold, creating a new rowset in the keyspace to include any data overflow.

4. The method of claim 2, wherein the new data includes a first data and a second data, and wherein the new rowset is a first rowset, the method further comprising:
    flushing the first data into the first rowset stored on the tablet;
    flushing the second data into a second rowset stored on the tablet, wherein the first rowset and the second rowset are equally sized;
    estimating an on-disk size for the first data and the second data prior to flushing the first data and the second data, wherein the estimating is (i) based on the amount of the first data and the second data in the memory element and (ii) based on a range covered by the first rowset and a range covered by the second rowset.

5. The method of claim 4, further comprising:
    sending a command to the data node to flush the first data and the second data in the memory element to the tablet, wherein the first rowset and the second rowset have key ranges that do not overlap.

6. The method of claim 1, further comprising:
    translating the keyspace of the tablet into an interval tree for determining the height of the tablet based on a union of the key ranges that overlap.

7. The method of claim 6, further comprising:
    determining a rowset height of each rowset included in the tablet, wherein rowset heights and rowset widths of the two or more rowsets are greatest in the plurality of rowsets.

8. The method of claim 1, wherein the plurality of rowsets includes a first rowset and a second rowset with overlapping ranges, wherein the minimum operational cost involves merging the first rowset and the second rowset, resulting in a reduction in the height of the tablet, upon compaction and for a given input/output (I/O) budget.

9. The method of claim 8, wherein the operational cost is applicable for point queries, short scans, inserts, and random reads.

10. The method of claim 1, wherein the operational cost for long scans is directly proportional to a number of megabytes covered by a scan and inversely proportional to a disk bandwidth.

11. The method of claim 1, wherein the operational cost for long scans includes a direct proportionality to a cost of a key lookup and a number of rowsets accessed during the scan.

12. The method of claim 1, wherein the operational cost for short scans is directly proportional to a number of rowsets accessed during a scan and a cost of a key lookup, wherein overlapping rowsets are looked up by a respective primary key.

13. A computer-implemented distributed database system including a processor, the system having at least a master node and a slave node, the slave node including a data node that hosts a plurality of tablets, the plurality of tablets being a part of a large distributed table managed by the master node, wherein the master and the slave nodes are configured together to:
    instantiate corresponding components of a compaction engine respectively on the master node and on the slave node, wherein the master and the slave nodes are physically separated but communicatively coupled together via a network;
    determine, by the compaction engine, a height of a tablet within a keyspace of the tablet based on a number of rowsets, in a plurality of rowsets included in the tablet, that have key ranges that overlap, wherein the tablet storing data is associated with a distributed file system (DFS);
    determine, by the compaction engine, a rowset width of each rowset in the keyspace of the tablet based on a percentage of the keyspace to which the rowset corresponds;
    until a minimum operational cost is reached, iteratively calculate, by the compaction engine, an operational cost associated with compaction of two or more rowsets in the keyspace based on the height of the tablet and the rowset widths of the two or more rowsets;

select, by the compaction engine, two or more particular rowsets for compaction based on the two or more particular rowsets resulting in the minimum operational cost; and perform, by the compaction engine through communicating instructions between the master node and the slave node over the network, a compaction of the two or more particular rowsets, the performed compaction resulting in a merger of the two or more particular rowsets, wherein the compaction results in one or more of: reduction in the height of the tablet, removal of overlapping rowsets, and/or creation of smaller sized rowsets.

14. The system of claim 13, wherein the plurality of rowsets includes a first rowset and a second rowset with overlapping ranges, wherein the minimum operational cost involves merging the first rowset and the second rowset so as to result in a reduction in the height of the tablet.

15. The system of claim 13, wherein the operational cost is applicable for point queries, short scans, inserts, and random reads.

16. A computer-implemented method for organizing data into segments to improve read performance in a distributed database system having at least a master node and a slave node, the slave node including a data node that hosts a plurality of tablets, the plurality of tablets being a part of a large distributed table managed by the master node, the method comprising:

instantiating corresponding components of a compaction engine respectively on the master node and on the slave node, wherein the master and the slave nodes are physically separated but communicatively coupled together via a network;

determining, by the compaction engine, a height of a tablet within a keyspace of the tablet based on a number of rowsets, in a plurality of rowsets included in the tablet, that have key ranges that overlap;

determining, by the compaction engine, a rowset width of each rowset in the keyspace of the tablet based on a percentage of the keyspace to which the rowset corresponds;

until a minimum operational cost is reached, iteratively calculating, by the compaction engine, an operational cost associated with compaction of two or more given rowsets in the keyspace based on the height of the tablet and the rowset widths of the given two or more rowsets; and compacting, by the compaction engine through communicating instructions between the master node and the slave node over the network two or more particular rowsets in the keyspace based on a calculation that indicates that the compaction of the two or more particular rowsets results in the minimum operational cost, wherein the compaction results in one or more of: reduction in the height of the tablet, removal of overlapping rowsets, and/or creation of smaller sized rowsets.

17. The method of claim 16, further comprising, selecting the two or more given rowsets for the iterative calculation, wherein selecting the two or more given rowsets includes:

identifying, by the compaction engine, a first rowset from the plurality of rowsets;

identifying, by the compaction engine, one or more candidate rowsets from the plurality of rowsets based on a key value of the first rowset; and selecting, by the compaction engine, a second rowset from the one or more candidate rowsets based on a key value of the second rowset, the second rowset being different than the first rowset, wherein the two or more given rowsets include the first rowset and the second rowset.

18. The method of claim 16, wherein the two or more given rowsets for the iterative calculation includes a first rowset and a second rowset, wherein each of the two or more given rowsets has (i) a minimum key value greater than or equal to a minimum key value of the first rowset and (ii) a maximum key value less than or equal to a maximum key value of the second rowset.

19. The method of claim 16, further comprising:

restricting each rowset in the plurality of rowsets included in the tablet to have a size less than a predetermined size threshold, wherein each rowset stores keys covering a range that is less than or equal to a keyspace of the tablet.

20. A computer-implemented distributed database system having at least a master node and a slave node, the slave node including a data node that hosts a plurality of tablets, the plurality of tablets being a part of a large distributed table managed by the master node, wherein the master and the slave nodes are configured together to:

instantiate corresponding components of a compaction engine respectively on the master node and on the slave node, wherein the master and the slave nodes are physically separated but communicatively coupled together via a network;

determine, by the compaction engine, a height of a tablet within a keyspace of the tablet based on a number of rowsets, in a plurality of rowsets included in the tablet, that have key ranges that overlap;

determine, by the compaction engine, a rowset width of the each rowset in the keyspace of the tablet based on a percentage of the keyspace to which the rowset corresponds;

until a minimum operational cost is reached, iteratively calculate, by the compaction engine, an operational cost associated with compaction of two or more rowsets in the keyspace based on the height of the tablet and the rowset widths of the two or more rowsets; and compact, by the compaction engine through communicating instructions between the master node and the slave node over the network, the two or more rowsets based on the two or more rowsets resulting in the minimum operational cost, wherein the compaction results in one or more of: reduction in the height of the tablet, removal of overlapping rowsets, and/or creation of smaller sized rowsets.

* * * * *